United States Patent [19]

Pischke et al.

[11] Patent Number: 4,525,783
[45] Date of Patent: Jun. 25, 1985

[54] METHOD AND APPARATUS FOR DETERMINING THE INDIVIDUAL MANIPULATED VARIABLES OF AN INTERNAL COMBUSTION ENGINE, AND IN PARTICULAR OF A GAS TURBINE

[75] Inventors: Jürgen Pischke, Markgröningen; Wolfgang Nonnenmann, Pforzheim, both of Fed. Rep. of Germany

[73] Assignee: Robert Bosch GmbH, Stuttgart, Fed. Rep. of Germany

[21] Appl. No.: 558,556

[22] Filed: Dec. 5, 1983

Related U.S. Application Data

[63] Continuation of Ser. No. 78,613, Sep. 24, 1979, abandoned.

[30] Foreign Application Priority Data

Sep. 26, 1978 [DE] Fed. Rep. of Germany ....... 2841750

[51] Int. Cl.³ .................... F02C 9/04; F02D 28/00; F02D 5/00
[52] U.S. Cl. ........................ 364/431.11; 60/39.281; 123/480; 364/431.02
[58] Field of Search .............. 364/431.02, 431.05, 364/431.11, 442, 200; 123/480; 60/39.28 R

[56] References Cited

U.S. PATENT DOCUMENTS

| | | | |
|---|---|---|---|
| 3,286,239 | 11/1966 | Thompson et al. | 364/200 |
| 4,033,112 | 7/1977 | Schuster | 60/39.28 R |
| 4,058,975 | 11/1977 | Gilbert et al. | 60/39.28 R |
| 4,099,495 | 7/1978 | Kiencke et al. | 364/442 |
| 4,161,101 | 7/1979 | Drummond et al. | 364/431.02 |
| 4,163,282 | 7/1979 | Yamada et al. | 364/431.05 |
| 4,200,064 | 4/1980 | Engele | 123/480 |
| 4,209,829 | 6/1980 | Leichle | 364/442 |
| 4,249,238 | 2/1981 | Spang et al. | 364/431.02 |
| 4,276,601 | 6/1981 | Tokuda et al. | 364/431.05 |

OTHER PUBLICATIONS

Morris et al.: Scamp Microprocessor Aims to Replace Mechanical Logic, Electronics, Sep. 18, 1975, pp. 81/87.
Morley: Measurement System Logs Analog Data, Electronics Book Series, McGraw Hill, 1976, pp. 163/164.
INTEL: The 8080/8085 Microprocessor Book, John Wiley, 1980, pp. 98/99 of interest.

*Primary Examiner*—Felix D. Gruber
*Attorney, Agent, or Firm*—Edwin E. Greigg

[57] ABSTRACT

A method and an apparatus for determining the individual manipulated variables of an internal combustion engine such as a gas turbine or the like derived on the basis of given and measured operating characteristics such as rpm and temperature, including a computer having associated programs for control and data detection or data output and the various program courses take place preferably in alternation. The control program is interrupted at fixed times, and during the interruption, a special program for data detection or data output is performed. The method of the invention makes input data available continuously, which then can be called up during the normal control program course from working memories and from time to time input and output data is brought up to the most recent state. The computer includes at least two program memories, a fixed point memory for control parameters, a time control device for the interruption each time of the control program and memories, associated directly with the computer, for input and output data or signals.

6 Claims, 4 Drawing Figures

4,525,783

METHOD AND APPARATUS FOR DETERMINING THE INDIVIDUAL MANIPULATED VARIABLES OF AN INTERNAL COMBUSTION ENGINE, AND IN PARTICULAR OF A GAS TURBINE

This is a continuation of copending application Ser. No. 078,613 filed Sept. 24, 1979 and now abandoned.

BACKGROUND OF THE INVENTION

Known feedback control means for gas turbines function in part on an analog basis and in part digitally, with the individual operating characteristics being continuously processed and made available. The determination of the output variables also takes place continuously, with the computation processes for the individual control variables taking place generally in parallel and/or in series. As a result there is a large expenditure for the circuitry, and thus also a large number of possible sources of error, which it is particularly desired to avoid in the known critical gas turbine feedback control means.

OBJECT AND SUMMARY OF THE INVENTION

The method in accordance with the invention has the advantage over the prior art in that both the data detection and the data processing and data output are controlled with one computer. The control program for determining the individual manipulated variables runs continuously, while, at preferably constant time intervals, this program course is interrupted, and a special program for data detection or data output effects an appropriate preparation and output of the data. After each running of the special program, the normal control program begins over again at the point at which it was previously interrupted. For this reason, only a single computer is required in the proposed system. The multiplicity of memory units is not so important, because in the present state of the art, they are obtainable without difficulty and are also favorable in cost. Also, it has proved to be efficient to prepare at least some of the input variables, which are present in analog form, via a multiplexer in accordance with another aspect of this invention.

From the standpoint of simplicity, the apparatus of the invention is particularly new and novel, because of the simplicity of the method of the invention. Thus, for example, a monitoring apparatus is provided for the essential characteristics of the gas turbine, and this monitoring apparatus enables both emergency operation of the gas turbine with a reduced output and a rapid shutoff signal for the gas turbine in case of emergency, depending on conditions.

The invention will be better understood as well as further objects and advantages thereof become more apparent from the ensuing description of a preferred embodiment taken in conjunction with the drawings.

DESCRIPTION OF THE PREFERRED EMBODIMENTS

Figure 1:
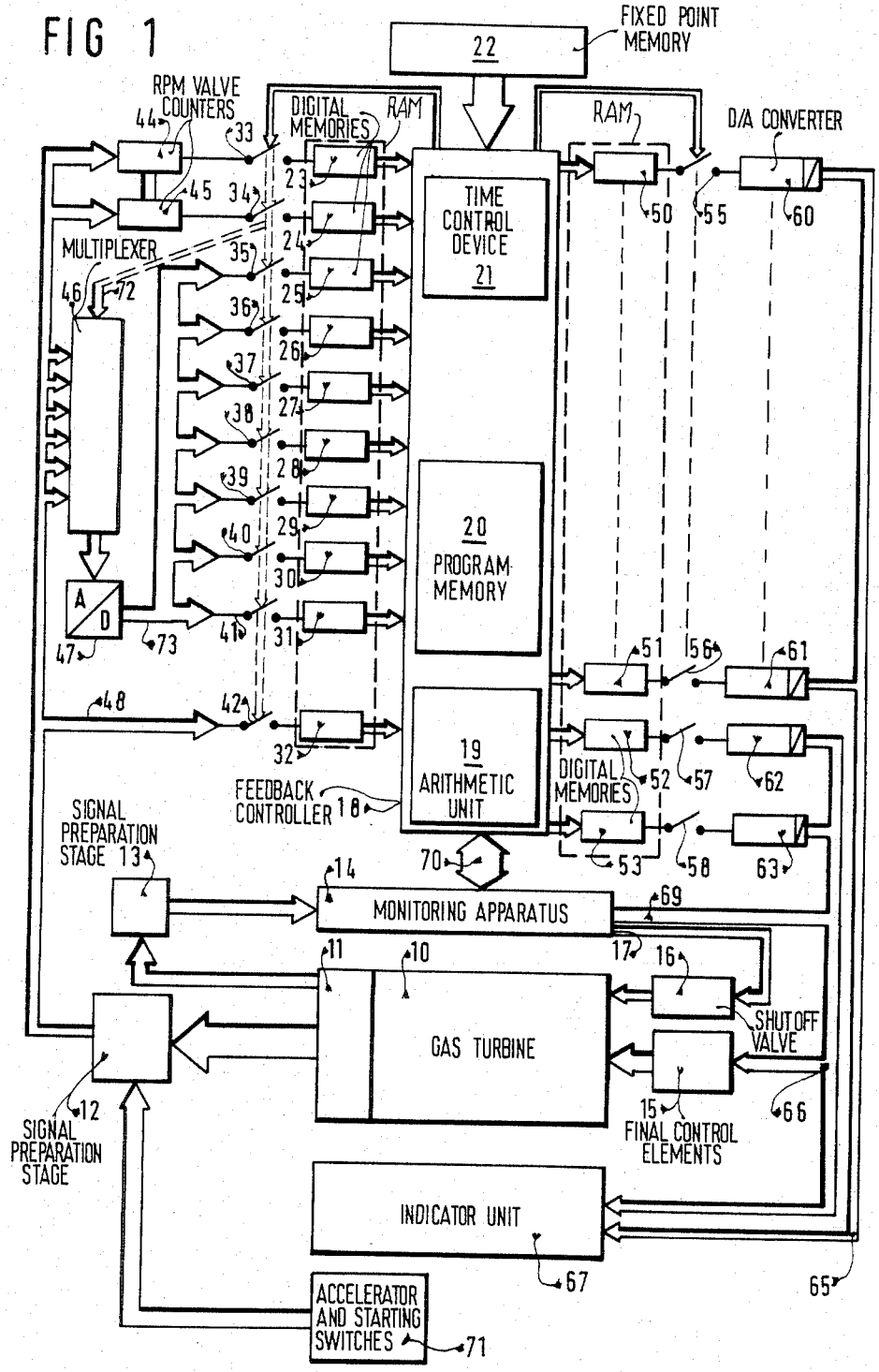
FIG. 1 is a schematic block diagram of a digital, computer-controlled gas turbine feedback controller.

FIG. 1 is a schematic block diagram of the feedback control apparatus for a gas turbine which can be put to use, for example, in a motor vehicle. The gas turbine itself is indicated by reference numberal 10 and coupled therewith are measurement transducers 11 for the operating characteristics of the gas turbine 10, such as rpm and temperature. For reasons of safety, two measurement value receptors are also present for the most essential operating characteristics. These measurement value receptors are coupled either with a signal preparation stage 12 for the feedback controller or with a signal preparation stage 13 for a monitoring apparatus 14. Further associated with the gas turbine 10 are final control elements 15 and a shutoff valve 16 for the purpose of emergency shutoff. This shutoff valve 16 is coupled with one output 17 of the monitoring apparatus 14.

The feedback controller 18 itself includes an arithmetic unit 19, a program memory 20, and a time control device 21. The controller 18 receives input variables from a fixed point memory 22 and from various digital memories 23–32. Preceding each of these memories 23–32 are switches 33–42, with these switches 33–42 being controlled by an output signal of the time control device 21. Between the signal preparation stage 12 for the controller 18 and the switches 33–42, there are two rpm value counters 44 and 45, a multiplexer 46 with a subsequent analog-digital converter 47, whose output is delivered to the switches 35–41, and the variables from the signal preparation stage 12 of the controller 18, which are already present in digital form, proceed directly via a line 48 to the switch 42.

On the output side, the controller 18 is connected with several digital memories 50–53, which are representative of a possible greater number of such memories. Disposed subsequent to these memories 50–53 are switches 55–58, and finally digital-analog converters with integrated memories 60–63. The data which are available in these memories 60–63 are delivered over lines 65 and 66 (shown here as bus bars) to an indicator unit 67 and to the final control elements 15 in the gas turbine 10.

The monitoring apparatus 14 is also coupled with the final control elements 15 via a line 69, which, in special cases, can be used for maintaining emergency operation of the gas turbine 10. The purpose of monitoring the actual controller output signals is also served by a connection line 70 between the controller 18 and the monitoring apparatus 14, so that errors both in the controller 18 itself and in its input stages can also be detected.

Finally, operation elements such as the accelerator and starting switches are indicated by reference numeral 71, the outputs of which are coupled with the signal preparation stage 12 for the controller 18.

The primary feature in the arrangement of FIG. 1 is that the feedback controller 18, comprising a computer, interrupts its program at predetermined times and instead directs the preparation of the input data and the furnishing of the output data. To this end, the time control device 21 is coupled to operate the switches 33–42 and 55–58. While the control program is running its course (that is, until its interruption), these particular switches are opened, so that no variation of the input signals, which are intermediately stored in the digital memories 23–32, arises. In a corresponding manner, the values computed with the control program are continuously written into the digital memories 50–53 for output variables and kept at the most recent status.

Figure 4:
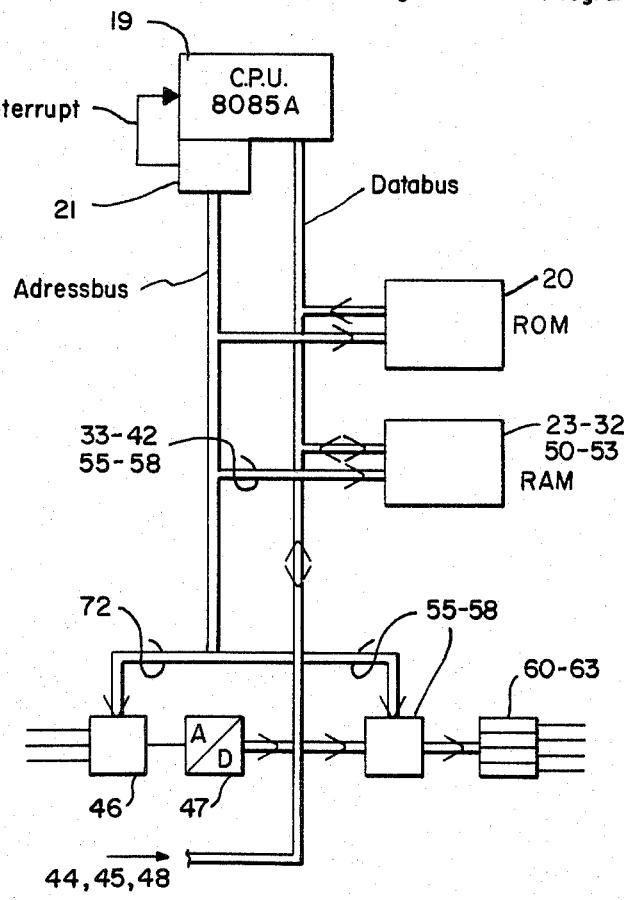
FIG. 4 is a block diagram of a portion of the system shown in FIG. 1.

During the interruption of the control program, the signals from the signal preparation stage 12 are put into a form suitable for digital processing in order that they can be fed into the digital memories 23–32 for input variables when the switches 33–42 are closed. In a corresponding fashion, the data from the digital memories 50–53 is fed into the subsequent memories 60–63, and from there this data is continuously fed to the corresponding final control elements 15 of the gas turbine 10 or to the indicator unit 67. The controller 18 contains CPU 19, program memory 20 and time control element 21, as shown in FIG. 4.

The arithmetic unit 19 of the controller 18 is contained in a microprocessor assembly of the type known as INTEL 8085A. Communication with all the peripheral units, such as the individual memories, takes place via bus bars for addresses, data and control signals. For the sake of simplicity, these are indicated only by a single or double arrow.

The rpm value counters 44 and 45 are embodied in two stages. While the first counter 44 counts a fixed number of rpm pulses (from the signal preparation stage 12 of the controller 18), the second counter 45, during the period required for the first counting process, counts up a constant comparison frequency. The inverse of the signal thus obtained is proportional to the frequency.

The multiplexer 46 is addressed via a digital control line 72 and, in sequence, switches one pertinent analog variable from the signal preparation stage 12 for the controller 18 onto the input of the analog-digital converter 47. After the conversion period, each digitalized variable is fed via a data line 73 into the digital memories 25–31 for input variables.

The memories 23–32 and 50–53 are embodied as digital, static read-write semiconductor memories of the type known as INTEL 8155 and can be driven via data lines and via address lines (not shown). For the program and fixed point memories, 20 and 22 respectively, read-only memories are used (INTEL 2716), which may be, for example, electrically programmable and can be erased again by means of ultraviolet light. The memories 60–63 having digital-analog converters serve to relieve the actual controller from having to perform conversion tasks and furnish a constant value until the switches 55–58 are switched again.

In the fixed point memory 22 of the control parameters, specific variables for the particular gas turbine being used are stored and can be called up by the computer as needed. The initial variables for the beginning of the gas turbine operation can also be stored in this fixed point memory 22. The easy interchangeability of this memory 22 enables a simple variation of the control parameters.

Figure 2:
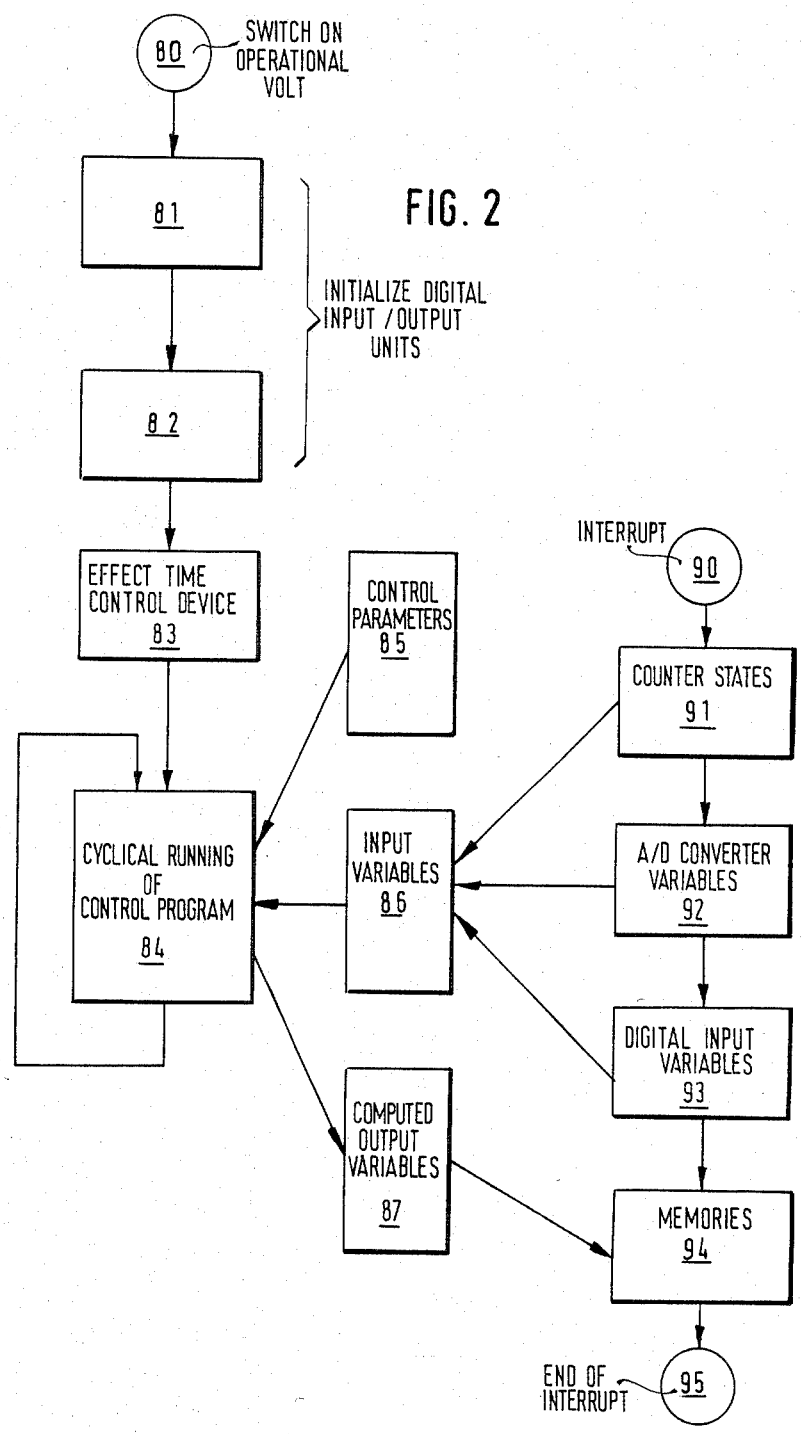
FIG. 2 is a sequence and data flow diagram for the invention shown in FIG. 1.

FIG. 2 shows a sequence and data flow diagram for the arrangement of FIG. 1. After the operational voltage is switched on (80), an initialization of the counters and memories of the digital input-output units (81, 82) takes place, and the time control device 21 becomes effective (83). Subsequently, the given control program (84) is cyclically run, which has both reading access into the control parameters (85) and the input variables (86) and writing access into the memories for the computed output variables (87).

The program is interrupted at constant intervals, for example, every 10 msec, by the time control device 21 (90). At these instants, the counter states (91), the analog-digitally converted variables (92) and the digital input variables (93) are written into the memories 23–32 for the use of the computer.

In a corresponding manner, the variables computed by the control program, such as period-analog pulses or digital variables are outputted into the memories 60–63 (94). Finally, the reversion (95, end of the interruption) into the control program takes place and the control program resumes its computations again at the interrupted point. This sequence described above is indicated in FIG. 2 as a sequence and data flow diagram.

In the apparatus of FIG. 1, the control program is interrupted at constant time intervals and subsequently the data flow is controlled. However, there may be cases in which this constant-time control is changed, with a view to increased assurance or more precise variables, in such a manner that upon the apparance of large variations in operating characteristics, new data is placed at the disposal of the computer in rapid sequence and accordingly the variable computed at a particular time can also more rapidly reach the point of being indicated or be used for intervention. The type of operation selected is a question of the extent of justifiable expense and the possible speed attainable in varying the operating characteristics. As a compromise, a constant cycle time of 10 msec may be favorable for the purpose of using the gas turbine in motor vehicles.

The task of the arithmetic unit 19 in the controller 18 is the computation of various indicator variables and manipulated variables on the basis of operating characteristics and control variables of the gas turbine. The relationships between controller input signals and controller output signals are known, because certain operating characteristics of the gas turbine require a corresponding control of the various final control elements. In this sense, the automatic linkage of the input and output variables of the controller 18 furnishes the person skilled in data processing with a clear indication for appropriately programming the course of the program for the arithmetic unit 19.

Figure 3:
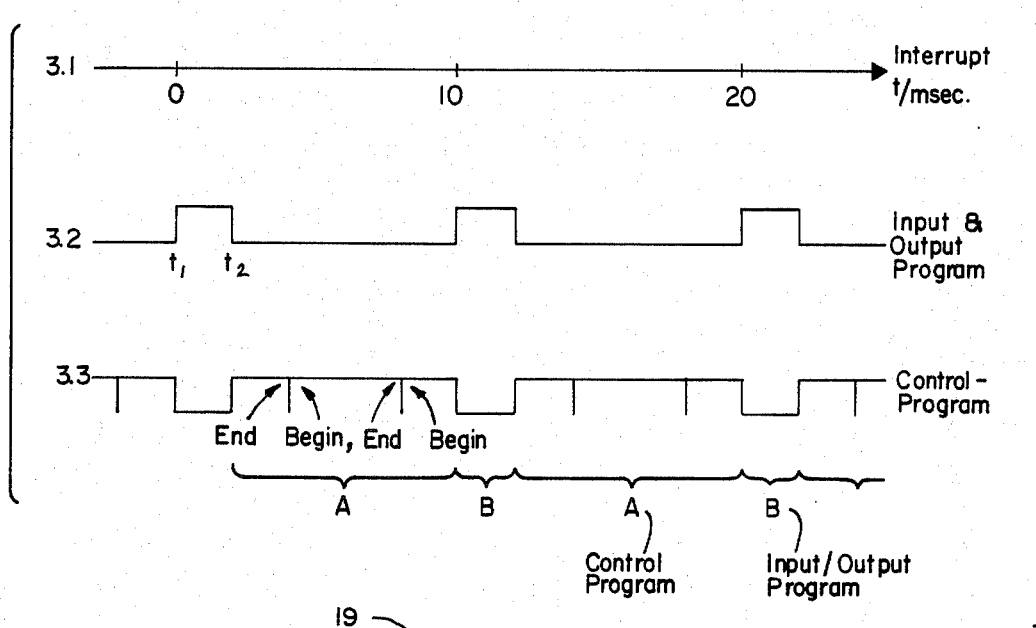
FIG. 3 is a timing diagram illustrating the alternating relationship between the alternative operation of the control program and the data detection and data output programs.

FIG. 3 illustrates the timing relationship between the control and data input-output programs. According to 3.1, an interrupt signal occurs at predetermined times. As a result, a switchover is made in the computer to a data input and output program, which last a certain length of time (FIG. 3.2). The diagram of 3.3 illustrates the running of the actual control program. The overall duration of the control program, in the example of FIG. 3.3, amounts to four msec., in accordance with the scale shown in FIG. 3.1. What is important here is that the control program starts over again immediately after it ends, that is, it is run continuously from beginning to end and then from beginning to end again. If an interrupt signal t, according to FIG. 3.1 arrives, and the data input and output program is started as a result, then in fact the course of the control program is interrupted, and at the end of the time t2 according to 3.2 it continues once again from the point at which it was interrupted by the interrupt signal t1. Thus, an interrupt signal ends the running of the control program and the computer simultaneously switches over the the data input and output program of FIG. 3.2.

As for the alternating running of the individual programs is concerned, the computer operates continuously, and in fact after each end of the control program the same program immediately starts anew, without an intervening pause. Consequently, the control program and the data input and output program continuously alternate with one another, that is, the two programs run in an alternating sequence depicted as A, B, A, B in FIG. 3.3. The interplay of the switches 33–42 and 55–58 shown in FIG. 1 includes the actual computer 19, the program memory 20 and a write-in memory in the form of a RAM, which is capable of storing in memory the input and output variables, among other information, in memories 23–32 and 50–53. Also shown is the multiplexer 46, the analog/digital converter 47, the digital/analog converters 60–63 and the associated memories, and the combination of switches 55–58 which assigns the values furnished via a data bus to the appropriate channels.

FIG. 4, in which only the reference numerals from FIG. 1 have been used, clarifies the interplay of the switches 33–42 and 55–58 shown in FIG. 1 and includes the actual computer 19, the program memory 20 and a write-in memory in the form of a RAM, which is capable of storing in memory the input and output variables, among other information, in memories 23–32 and 50–53. Also shown in FIG. 4 is the multiplexer 46, the analog-digital converter 47, a block having the digital/analog converters 60–63 and the associated memories, and a preceding block which assigns the values furnished via a data bus to the appropriate channels, by means of the combination of switches 55–58 as shown symbolically in FIG. 1.

The apparatus described above for determining the individual manipulated variables and indicator variable of an internal combustion engine, and in particular of a gas turbine, may be realized very simply even in the case of very complex linkages, because of the usage of digital elements. In addition, when such components are used, problems of temperature drift, aging, and so forth do not arise. Furthermore, the digital conception of the control apparatus provides the possibility of incorporating self-testing capacities in the controller; that is, the controller can monitor itself continuously, and if any components fail, the controller itself can decide whether the driving mechanism must be shut off, or whether emergency operation in order to reach the nearest repair facility is still permissible. This emergency operation would then take place at a reduced output and be indicated to the driver.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method for determining the individual input variables of an internal combustion engine such as a gas turbine or the like, derived from given and measured operating characteristics such as rpm and temperature in a computer having a timing control, a multiplex means for preparing at least some of said input variables, a feedback control program, a data detection program and a data output program, and an output memory having means for delivering data to indicating means and final control means for said engine, comprising the steps of generating control data by repetitively operating said control program from beginning to end to beginning, operating at predetermined times alternatively with said control program said data detection program and said data output program, interrupting said control program at predetermined fixed times, wherein said timing control operates said data detection program and said data output program when said control program is interrupted, and feeding the output signals from said data output program in a time-controlled manner to said output memory.

2. An apparatus for determining the individual input variables of an internal combustion engine, such as a gas turbine or the like, derived from given and measures operating characteristics such as rpm and temperature, in a computer having a timing control, a multiplex means for preparing at least some of said input variables, a feedback control program, a data detection and a data output program, said programs being operated in alternation, and said computer comprising a controller having an arithmetic unit, a program memory and a time control device;

at least one input memory means for input data, and at least one output memory means for output data, said output memory means having means for delivering said output data to at least one of an indicating means and a final control means for said engine, and said input memory means and said output memory means being associated with said arithmetic unit, wherein the time control device interrupts the control program at particular fixed times and said timing control switches the computer over to the data detection and data output program during which input variables are written into said at least one input memory means and output variables are read out of said at least one output memory means.

3. An apparatus in accordance with claim 2, further comprising a fixed point memory for control parameters and for the initial operating characteristics of the controlled internal combustion engine.

4. An apparatus for determining the individual input variables of an internal combustion engine, such as a gas turbine or the like, derived from given and measured operating characteristics such as rpm and temperature, in a computer having a time control device, a multiplex means for preparing at least some of said input variables, a feedback control program, a data detection and a data output program, said programs being operated in alternation, and said computer comprising a controller having an arithmetic unit, a program memory and a time control device;

a least one input memory means for input data, and at least one output memory means for output data, said output memory means having means for delivering said output data to at least one of an indicating means and a final control means for said engine, said input memory means and said output memory means being associated with said arithmetic unit, wherein the time control device interrupts the control program at particular fixed times and switches the computer over to the data detection and data output program during which input variables are written into said at least one input memory means and output variables are read out of said at least one output memory means, and a monitoring apparatus arranged to receive certain of a number of operating characteristics of the internal combustion engine, said monitoring apparatus having means for providing an output signal for controlling an emergency operation.

5. An apparatus in accordance with claim 4, further comprising a transducer associated with said monitoring apparatus for sensing said certain of a number of said operating characteristics of said gas turbine.

6. An apparatus in accordance with claim 4, wherein said monitoring apparatus is coupled with said controller for monitoring said controller.

* * * * *